(12) United States Patent  
Okayama (10) Patent No.: US 6,470,112 B2
(45) Date of Patent: Oct. 22, 2002

(54) LIGHTWAVE SYSTEM (75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/901,694

(22) Filed: Jul. 11, 2001

(65) Prior Publication Data

US 2002/0061162 A1 May 23, 2002

(30) Foreign Application Priority Data

Nov. 17, 2000 (JP) ........................................ 2000-350638

(51) Int. Cl.⁷ ................................................. G02B 6/24
(52) U.S. Cl. ....................... 385/24; 359/123; 359/128; 709/249
(58) Field of Search ............................. 385/16–24, 147; 359/117, 118, 123, 128, 140, 165, 158, 124, 127, 126; 709/249, 224; 379/114.01; 705/400, 401, 412

(56) References Cited

U.S. PATENT DOCUMENTS 5,477,362 A * 12/1995 Okamoto et al. .......... 359/117
5,506,713 A * 4/1996 Okamoto et al. .......... 359/117
6,374,307 B1 * 4/2002 Ristau et al. .............. 359/128

FOREIGN PATENT DOCUMENTS

JP 62488 * 2/2002 ............... 385/24

OTHER PUBLICATIONS

"The Wavelength Add/Drop Multiplexer for Lightwave Communication Networks" Giles et al., Bell Labs Technical Journal, Jan.–Mar. 1999, pp. 207–229.

* cited by examiner

Primary Examiner—Akm E. Ullah
(74) Attorney, Agent, or Firm—Venable; Michael A. Sartori (57) ABSTRACT A lightwave system comprises an optical signal bus; an input/output interface including a first, a second and a third port, an optical signal inputted to the first port being outputted from the second port, an optical signal inputted to the third port being outputted from the first port; an optical tap, through which the optical signal which is outputted from the second port of the input/output interface is sent to the optical signal bus; a variable wavelength filter, through which an optical signal having a designated wavelength is outputted from the optical signal bus, thereby being sent to the third port of the input/output interface; and a controller which designates the wavelength of the optical signal which is to be sent from the optical signal bus through the variable wavelength filter.

20 Claims, 6 Drawing Sheets

LIGHTWAVE SYSTEM

BACKGROUND OF THE INVENTION

The present invention relates to a lightwave system for selectively connecting input/output ports by optical paths.

The prior art lightwave systems are disclosed in "Bell Labs Technical Journal, January–March 1999, pp. 220–224", for example. The literature discloses an arrangement including a combination of multiplexer/demultiplexer elements and optical switches, an arrangement including a combination of arrayed waveguide diffraction gratings and phase shifters, and an arrangement including variable optical fiber gratings. In these arrangements, an optical path through which an optical signal proceeds is basically selected in accordance with the wavelength by switching elements. The prior art lightwave systems for selectively connecting input/output ports are categorized into two types. In the first type of the lightwave system, wavelength division multiplexed (WDM) optical signals are divided into a plurality of optical signals of different wavelengths, and then the optical signals are sent through an optical path selection element to the different output ports, respectively. In the second type of the lightwave system, a multiport system including 2×2 switching elements in cascade connection is provided where a single switching element is capable of selecting an output path in accordance with the wavelength.

The above-described prior art lightwave systems require that demultiplexing or multiplexing elements for WDM optical signals be provided in anticipation of an increased number of ports, resulting in a high initial cost for the manufacture of a lightwave system.

Another drawback of the prior art lightwave systems lies in the lack of flexibility, that is, the lightwave systems cannot be expanded later to add a variety of functions.

SUMMARY OF THE INVENTION

It is an object of the present invention to provide a lightwave system which can selectively connect input/output ports by optical paths with a simple arrangement while affording an excellent expandability.

According to the present invention, a lightwave system comprises an optical signal bus; an input/output interface including a first port, a second port and a third port, an optical signal inputted to the first port being outputted from the second port, an optical signal inputted to the third port being outputted from the first port; an optical tap, through which the optical signal which is outputted from the second port of the input/output interface is sent to the optical signal bus; a variable wavelength filter, through which an optical signal having a designated wavelength is outputted from the optical signal bus, thereby being sent to the third port of the input/output interface; and a controller which designates the wavelength of the optical signal which is to be sent from the optical signal bus through the variable wavelength filter.

According to another aspect of the present invention, a lightwave system comprises a plurality of layers, each of which includes an optical signal bus, an optical tap, through which an optical signal is sent to the optical signal bus, and a variable wavelength filter, through which an optical signal having a designated wavelength is outputted from the optical signal bus; an input/output interface including a first port, a second port and a third port, an optical signal inputted to the first port being outputted from the second port, an optical signal inputted to the third port being outputted from the first port; a wavelength splitter which divides a wavelength division multiplexed optical signal into optical signals having different wavelengths, a wavelength division multiplexed optical signal inputted to the first port of the input/output interface being transmitted through the second port of the input/output interface to the wavelength splitter, the optical signals produced by the wavelength splitter being transmitted through the optical taps to the optical buses, respectively; and an optical multiplexer which multiplexes optical signals to produce a wavelength division multiplexed optical signal, optical signals being transmitted through the variable wavelength filters to the optical multiplexer, a wavelength division multiplexed optical signal produced by the optical multiplexer being sent to the third port of the input/output interface; and a controller which designates the wavelength of the optical signal which is to be sent from the optical signal bus through the variable wavelength filter.

In the lightwave system of the present invention, a number of input/output interfaces, which maybe as many as can be desired, are connected to the optical signal bus. Input/output interfaces connected to the optical signal bus can be augmented by connecting a variable wavelength filter or an optical tap, thus affording an excellent expandability.

In a case where WDM optical signals are divided by the optical splitter to be sent to each optical signal bus layer, the number of wavelengths per optical signal bus layer can be reduced so that the lightwave system can provide a large scale of wavelength channels.

Furthermore, in a case where the star coupler is used with the optical signal bus or where the optical linear bus is used as the optical signal bus, distribution of optical signals is facilitated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
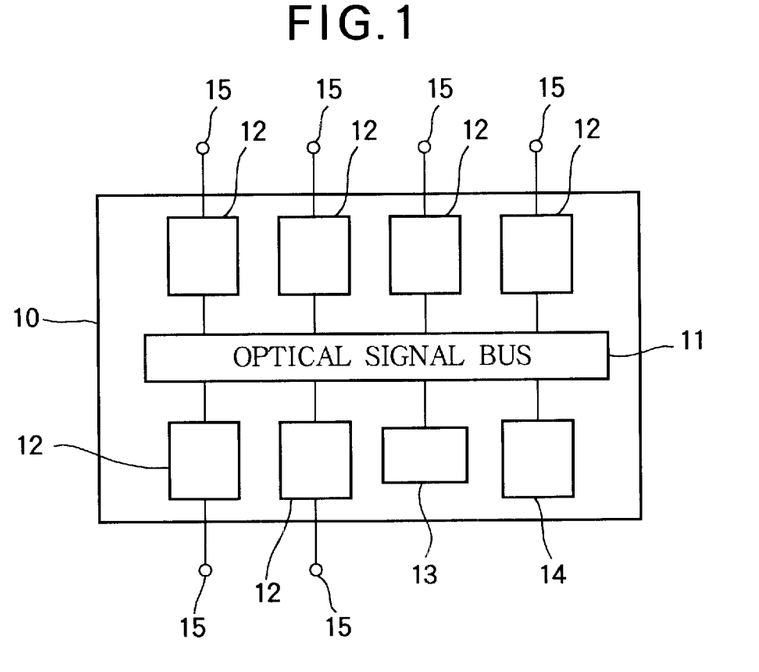
FIG. 1 is a conceptual block diagram showing an outline of a lightwave system according to the present invention.

FIG. 1 is a conceptual block diagram showing a lightwave system 10 according to the present invention. As shown in FIG. 1, the lightwave system 10 comprises an optical signal bus 11, and a plurality of input/output interfaces 12 connected to the optical signal bus 11. Further, the lightwave system 10 comprises an optical delay line memory 13 for temporarily storing an optical signal inputted to the optical signal bus 11, an optical signal processor 14 which processes an optical signal inputted to the optical signal bus 11, and input/output ports 15. A WDM optical signal is inputted to the optical signal bus 11 through a certain input/output port 15 and an associated input/output interface 12. An optical signal having a wavelength designated by a controller (not shown in FIG. 1) is transmitted from the optical signal bus 11 through a variable wavelength filter (not shown in FIG. 1) and an input/output interface 12 (which may be the same as or different from the input/output interface through which the WDM optical signal is inputted) and is outputted from an input/output port 15.

Figure 2:
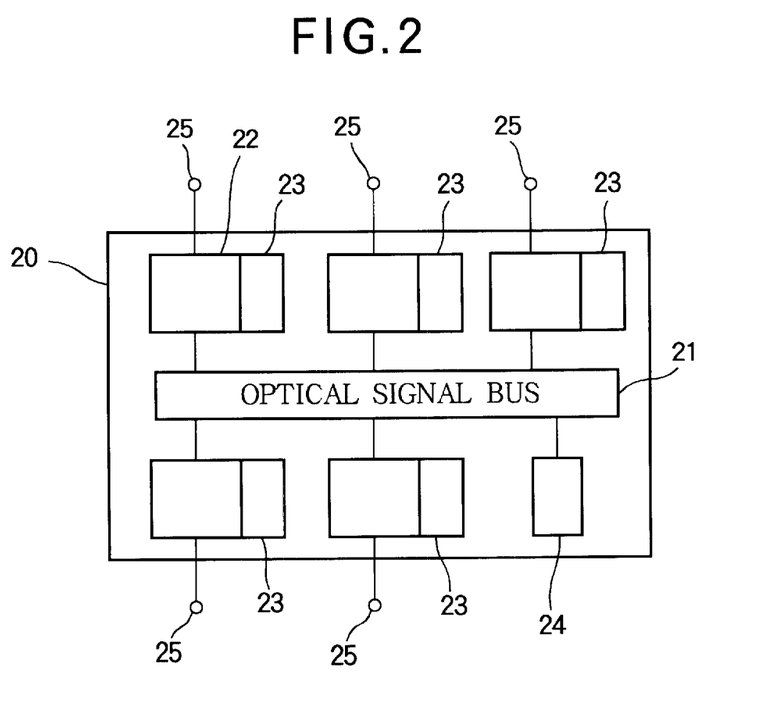
FIG. 2 is a conceptual block diagram showing an outline of another lightwave system according to the present invention.

FIG. 2 is a conceptual block diagram showing another lightwave system 20 according to the present invention. As shown in FIG. 2, the lightwave system 20 comprises an optical signal bus 21 and a plurality of input/output interfaces 22. Further, the lightwave system 20 comprises optical delay line memories 23 for temporarily storing an optical signal which is to be sent to the optical signal bus 21 or which is sent from the optical signal bus 21. Furthermore, the lightwave system 20 comprises an optical signal processor 24 connected to the optical signal bus 21 for processing an optical signal inputted to the optical signal bus 21, and input/output ports 25. A WDM optical signal is inputted to a certain input/output port 25 to be sent to the optical signal bus 21 through an input/output interface 22. An optical signal having a wavelength designated by a controller (not shown in FIG. 2) is transmitted from the optical signal bus 21 through a variable wavelength filter (not shown in FIG. 2) and an input/output interface 22 (which may be the same as or different from the input/output interface through which the WDM optical signal is inputted) and is outputted from an input/output port 25. The location of each optical delay line memory 23 in the lightwave system 20 shown in FIG. 2 is different from that of the optical delay line memory 13 in the lightwave system 10 shown in FIG. 1. While the connection of the optical delay line memory 13 with the optical signal bus 11 as shown in FIG. 1 is preferred in respect of the simplicity of the construction and the manufacturing cost of the lightwave system, the association of the optical delay line memory 23 with each input/output interface 22 as shown in FIG. 2 is preferred in respect of the functional aspects, namely, the capability to retain only input data or only output data.

Figure 3:
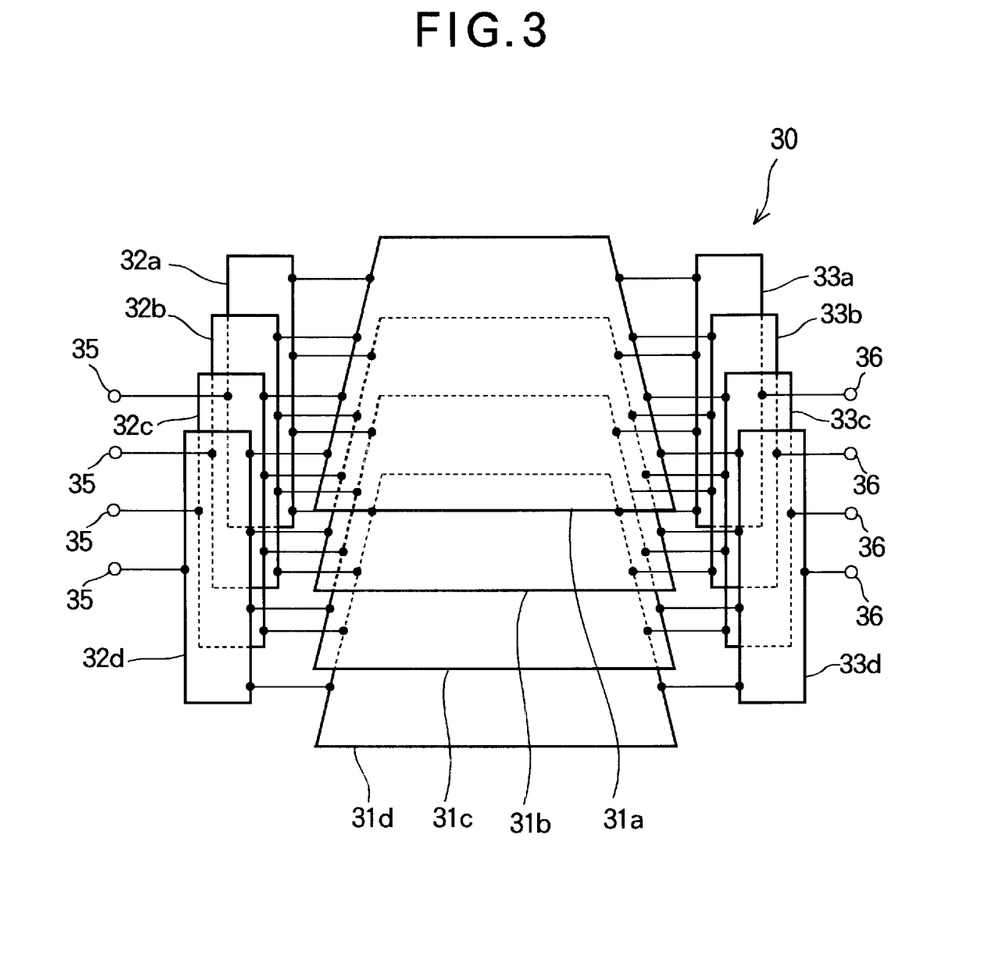
FIG. 3 is a conceptual block diagram showing a further lightwave system according to the present invention.

FIG. 3 is a conceptual block diagram showing a further lightwave system 30 according to the present invention. As shown in FIG. 3, the lightwave system 30 comprises four layers 31a, 31b, 31c and 31d each including an optical signal bus. Further, the lightwave system 30 comprises wavelength splitters 32a, 32b, 32c and 32d, each of which divides a WDM optical signal so as to transmit the divided optical signals to the optical signal buses in the layers 31a, 31b, 31c and 31d, respectively. Furthermore, the lightwave system 30 comprises optical multiplexers 33a, 33b, 33c and 33d which multiplex optical signals outputted from the optical signal buses in the layers 31a, 31b, 31c and 31d. In addition, the lightwave system 30 comprises input ports 35 and output ports 36. When a WDM optical signal is inputted to the input port 35, the WDM optical signal is divided by the wavelength splitters 32a, 32b, 32c and 32d in accordance with the wavelengths, whereby the divided optical signals are transmitted to the optical signal buses in the layers 31a, 31b, 31c and 31d. Of the optical signals which are inputted to the optical signal bus in the layers 31a, 31b, 31c and 31d, those optical signals having wavelengths designated by a controller (not shown in FIG. 3), through variable wavelength filters (not shown in FIG. 3) are multiplexed by the optical multiplexers 33a, 33b, 33c and 33d to be transmitted through the output port 36. When the optical signal bus comprises a single layer as shown in FIG. 1 or FIG. 2, it is possible that the optical signals which are inputted to a single optical signal bus has a very high multiplexing level, which may renders the processing of the optical signals difficult. However, when the multi-layer structure of the optical signal bus as shown in FIG. 3 is employed, the multiplexing level of wavelengths can be reduced, thus avoiding the possibility that the processing of the optical signals may be rendered difficult.

First Embodiment

Figure 4:
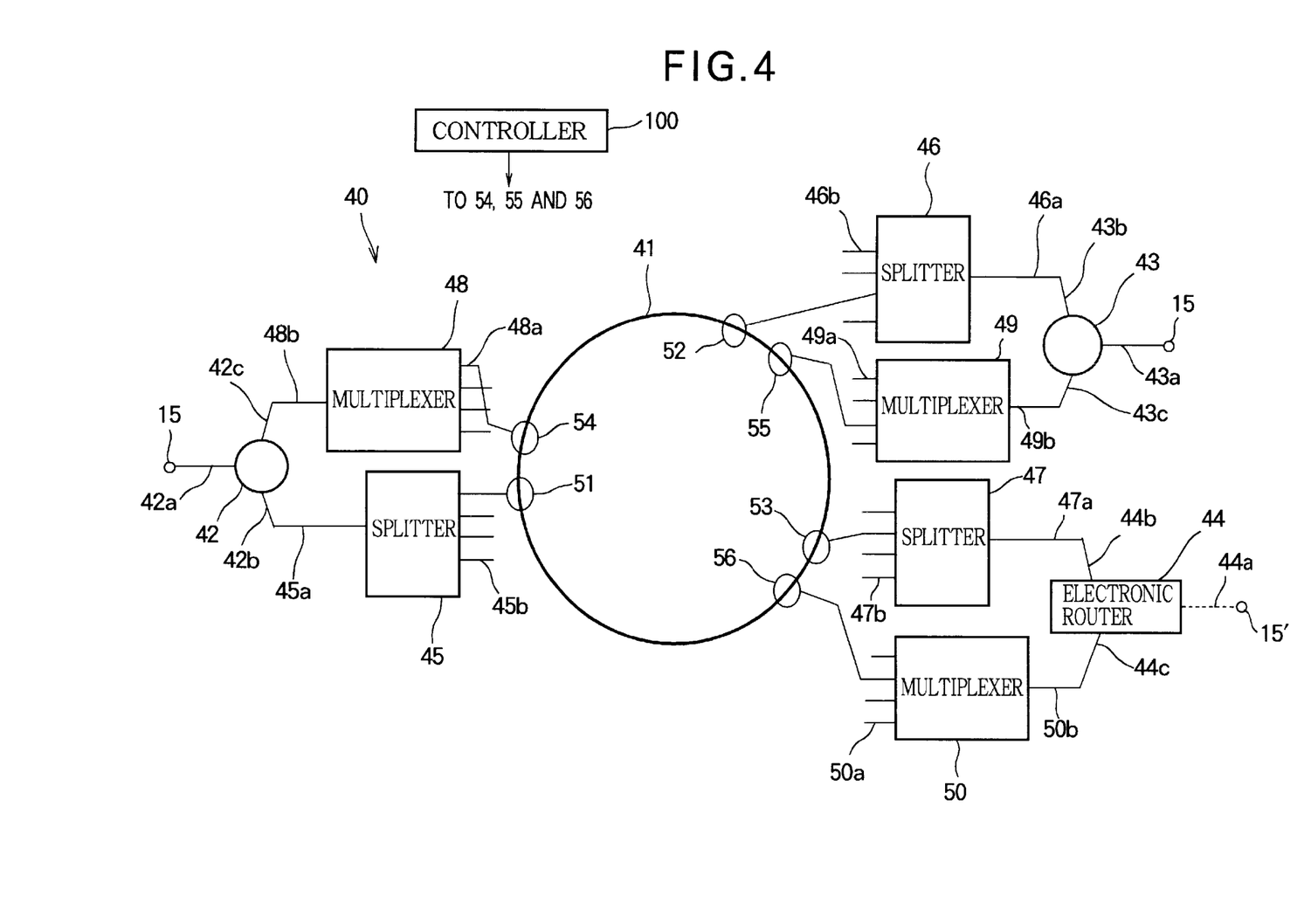
FIG. 4 is a schematic circuit diagram showing a lightwave system according to the first embodiment of the present invention.

FIG. 4 is a schematic circuit diagram showing a lightwave system 40 according to the first embodiment of the present invention. The lightwave system 40 has a multi-layer (not limited to four layers) structure including optical ring buses, as shown in FIG. 3. However, to facilitate the understanding of the present invention, a single layer optical ring bus 41 is shown in FIG. 4.

The lightwave system 40 comprises three-port optical circulators 42 and 43. The optical circulator 42 includes a first, a second and a third port 42a, 42b and 42c, while the optical circulator 43 includes a first, a second and a third port 43a, 43b and 43c. In the optical circulator 42, an optical signal which is inputted to the first port 42a is outputted from the second port 42b, and an optical signal which is inputted to the third port 42c is outputted from the first port 42a. In the optical circulator 43, an optical signal which is inputted to the first port 43a is outputted from the second port 43b, and an optical signal which is inputted to the third port 43c is outputted from the first port 43a.

Further, the lightwave system 40 comprises an electronic router 44. The electronic router 44 has a function which is equivalent to the optical signal processor 14 shown in FIG. 1, and performs the wavelength channel switching and the packet switching. The electronic router 44 may be provided with an input/output port 15', through which an optical signal may be inputted or outputted. In this case, the electronic router 44 operates such that it processes an optical signal which is inputted to a first port 44a to output it from a second port 44b and processes an optical signal which is inputted to a third port 44c to output it from the first port 44a.

Furthermore, the lightwave system 40 comprises a plurality of wavelength splitters 45, 46 and 47 which divide a WDM optical signal according to the wavelength, and a plurality of optical multiplexers 48, 49 and 50 which multiplex a plurality of optical signals of different wavelengths to produce a WDM optical signal. The lightwave system 40 also comprises a plurality of optical taps 51, 52 and 53 through which an optical signal outputted from the wavelength splitter 45 is sent to the optical ring bus 41, and a plurality of variable wavelength filters 54, 55, and 56 through which only one of optical signals on the optical ring bus 41 which has a selected wavelength is outputted.

The wavelength splitters 45, 46 and 47 have input ports 45a, 46a and 47a, respectively, which are connected to the second port 42b of the optical circulator 42, to the second port 43b of the optical circulator 43, and to the second port 44b of the electronic router 44. The wavelength splitters 45, 46 and 47 have output ports 45b, 46b and 47b, respectively, which are connected through the optical taps 51, 52 and 53, respectively, to the optical ring bus 41 in each layer.

The optical multiplexers 48, 49 and 50 have input ports 48a, 49a and 50a, respectively, which are connected to the variable wavelength filters 54, 55 and 56, respectively, of the optical ring bus 41 in each layer. The optical multiplexers 48, 49 and 50 have output ports 48b, 49b and 50b, respectively, which are connected to the third port 42b of the optical circulator 42, to the third port 43b of the optical circulator 43, and to the third port 44b of the electronic router 44.

Moreover, the lightwave system 40 comprises a controller 100, which controls the variable wavelength filters 54, 55 and 56 in each layer and designates the wavelength of an optical signal to be outputted from the optical ring bus 41 through the variable wavelength filters 54, 55 and 56.

Figure 5:
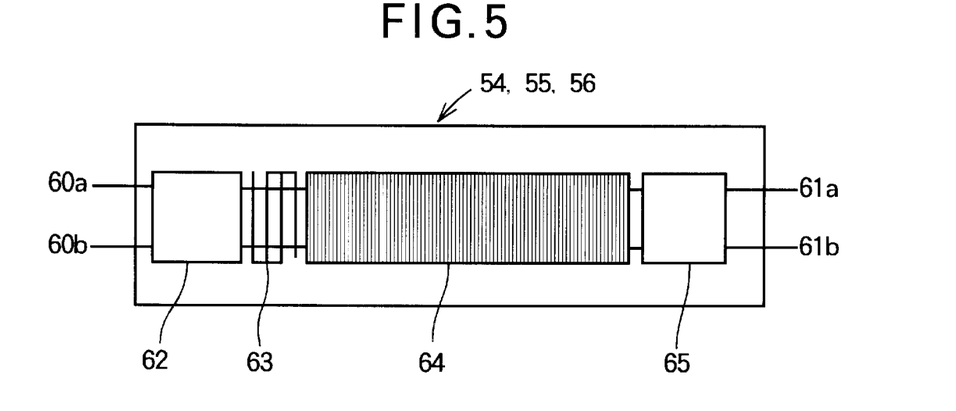
FIG. 5 is a schematic diagram showing a variable wavelength filter for use in the lightwave system according to the first to third embodiments.

FIG. 5 is a schematic diagram showing an acoustic-optical wavelength filter element serving as one of the variable wavelength filters 54, 55 and 56. The acoustic-optical wavelength filter element comprises light waveguides including input/output ports 60a, 60b, 61a and 61b formed on a substrate material having an acoustic-optical effect. Further, the acoustic-optical wavelength filter element comprises a polarization splitter 62, an interdigitated-electrode 63 having comb. structure for generating a surface acoustic wave, a surface acoustic wave guide 64, and a polarization splitter 65, which are disposed in these order. The polarization splitter 62 splits the incoming light into two new separate polarized rays with their planes of polarization at right angles to each other. After that, only an optical signal having a wavelength which corresponds to the wavelength of the surface acoustic wave changes its polarization, and is then selectively separated by the polarization splitter 65. Accordingly, the acoustic-optical wavelength filter element functions as a wavelength filter. By generating a plurality of surface acoustic waves of different wavelengths, it is possible to derive a plurality of optical signals having different wavelengths. A similar function can be implemented with variable wavelength fiber gratings in cascade connection even though the structure increases complexity to a degree.

In the first embodiment, the variable wavelength filters 54, 55 and 56 have their ports 60a and 61a connected to the optical ring bus 41 while either the ports 60b or 61b are connected to the input ports 48a, 49a and 50a of the optical multiplexers 48, 49 and 50.

In the lightwave system constructed in the manner mentioned above, an optical signal which is inputted through the first port 42a of the optical circulator 42 passes through the second port 42b to be inputted to the wavelength splitter 45 where the WDM optical signals are divided into several optical signals having different wavelengths to be inputted to the optical ring bus 41 of each layer (although only one layer is shown in FIG. 4) through the optical tap 51. Output ports of the wavelength splitter 45 are connected to the optical ring buses 41 of respective layers so that the optical signals having different wavelengths are inputted to the optical ring buses 41 of respective layers, respectively.

A desired optical signal or signals are derived through the variable wavelength filters 54, 55 and 56 from among the optical signals on the optical ring bus 41 in accordance with a control signal from the controller 100. The optical signals derived through the variable wavelength filters 54, 55 and 56 are multiplexed with optical signals which are derived from the optical ring buses 41 of other layers in the optical multiplexers 48, 49 and 50 to be outputted through the optical circulators 42 and 43 or the electronic router 44.

As described above, in the lightwave system 40 of the first embodiment, a required number of input/output interfaces such as the optical circulators 42 and 43 and the electronic router 44 can be connected to the optical ring bus 41, which provides a simple arrangement. In addition, by connecting the variable wavelength filters and the optical taps to the optical signal buses, the number of input/output interfaces which are connected to the optical signal buses can be augmented, thus affording an excellent expandability.

Second Embodiment

Figure 6:
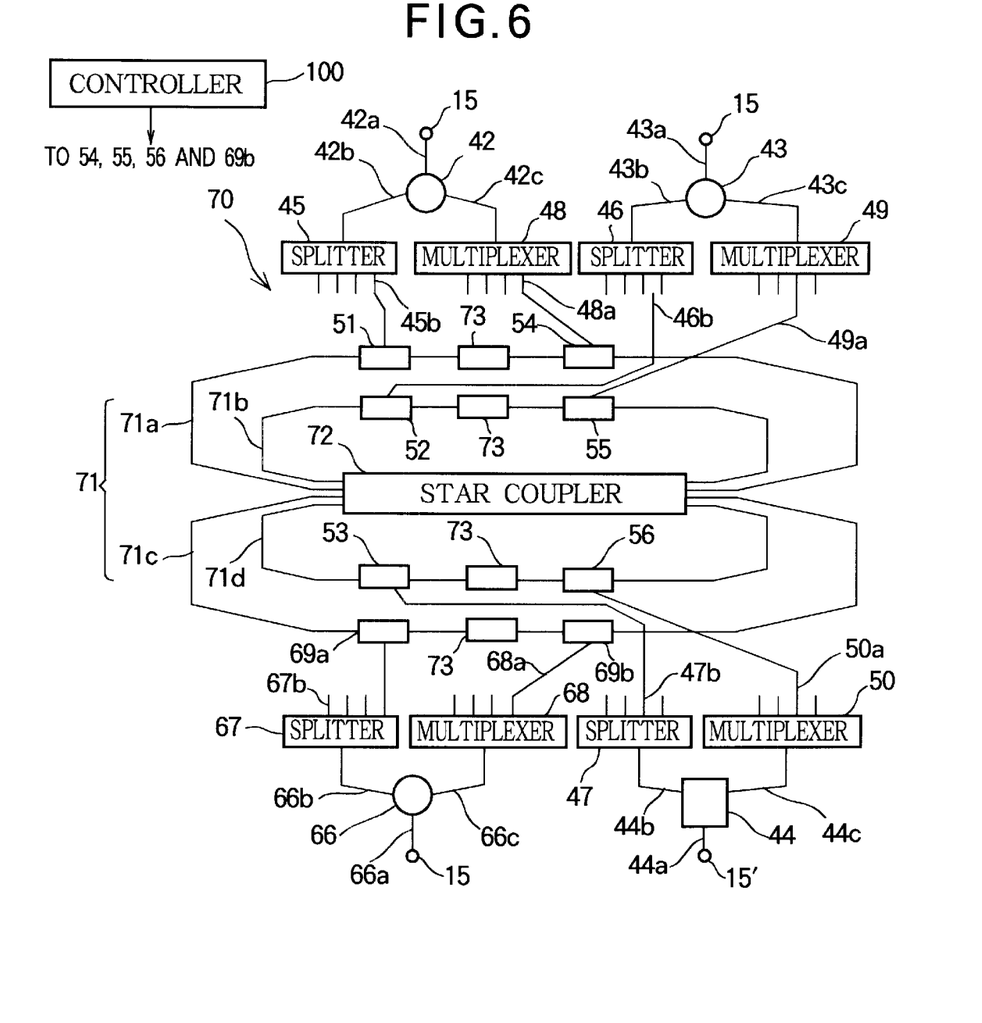
FIG. 6 is a schematic circuit diagram showing a lightwave system according to the second embodiment of the present invention.

FIG. 6 is a schematic circuit diagram showing a lightwave system 70 according to the second embodiment of the present invention. The lightwave system 70 has a multi-layer structure (which is not limited to four layers) of optical signal buses 71 each comprising optical signal paths 71a, 71b, 72a and 72b and a star coupler 72 connected thereto. However, to facilitate the understanding of the present invention, a single layer optical ring bus 71 is shown in FIG. 6.

The lightwave system 70 comprises three-port optical circulators 42, 43 and 66, which are equivalent to those shown in FIG. 4. Further, the lightwave system 70 comprises an electronic router 44, which is equivalent to that shown in FIG. 4 and functions to perform the wavelength channel switching and the packet switching.

Furthermore, the lightwave system 70 comprises wavelength splitters 45, 46, 47 and 67 which divide the WDM optical signal into the optical signals of different wavelengths, and optical multiplexers 48, 49, 50 and 68 which multiplex a plurality of optical signals of different wavelengths. Moreover, the lightwave system 70 comprises optical taps 51, 52, 53 and 69a, 33 through which the optical signals are sent from the wavelength splitters 45 onto the optical signal bus 71, and variable wavelength filters 54, 55, 56 and 69b which derives optical signals of designated wavelengths from among the optical signals on the optical signal bus 71.

The wavelength splitters 45, 46, 47 and 67 have input ports 45a, 46a, 47a and 67a which are connected to the second port 42b of the optical circulator 42, to the second port 43b of the optical circulator 43, to the second port 44b of the electronic router 44, and to the second port 66b of the optical circulator 66. The wavelength splitters 45, 46, 47 and 67 have output ports 45b, 46b, 47b and 67b which are connected to the optical signal buses 71 in the respective layers through the optical taps 51, 52, 53 and 69a, in a manner as illustrated in FIG. 3.

The optical multiplexers 48, 49, 50 and 68 have input ports 48a, 49a, 50a and 68a which are connected to the variable wavelength filters 54, 55, 56 and 69b on the optical signal buses 71 in the respective layers. The optical multiplexers 48, 49, 50 and 68 have output ports 48b, 49b, 50b and 68b which are connected to the third port 42b of the optical circulator 42, to the third port 43b of the optical circulator 43, to the third port 44b of the electronic router 44, and to the third port 66c of the optical circulator 66.

Moreover, the lightwave system 70 comprises a controller 100, which designates the wavelengths of optical signals which are to be outputted from the optical signal paths 71a, 71b, 71c and 71d through the variable wavelength filters 54, 55, 56 and 69b. Optical wavelength gates are shown at 73. The optical signal paths 71a, 71b, 71c and 71d may be interrupted at the locations of the optical wavelength gates 73, but the continuous optical signal paths 71a, 71b, 71c and 71d form optical delay line memories which are equivalent to the optical delay line memory 13 which is shown in FIG. 1, and which may be used during the optical packet switching.

In the lightwave system 70 constructed in the manner mentioned above, a WDM optical signal which is inputted through the first port 42a of the optical circulator 42 passes through the second port 42b to be inputted to the wavelength splitter 45 where the WDM optical signal is divided into several optical signals having different wavelengths to be inputted to the optical signal buses 71 in the respective layers through the optical taps 51, even though only one layer is shown in FIG. 4. Output ports of the wavelength splitter 45 are connected to the optical ring buses 71 in respective layers so that the optical signals having different wavelengths are inputted to the optical ring buses 71 in respective layers.

Optical signals are derived from among the optical signals on the optical signal bus 71 through the variable wavelength filters 54, 55, 56 and 69b. The optical signals which are derived through the variable wavelength filters 54, 55, 56 and 69b are multiplexed with optical signals which are derived from the optical signal buses 71 of other layers in the optical multiplexers 48, 49, 50 and 68 to be transmitted through the input/output port 15 or 15' through the optical circulators 42, 43, 66 or the electronic router 44.

When it is desired to derive the optical signals in the form of the packet, the optical wavelength gates 73 are used to define the optical delay line memory loops (for instance, the components 71a-72-71a-73). Some optical signals which are outputted from the optical tap 51 into the optical delay line memory may not be sent to the output port as a result of conflict with other optical signals, and are maintained in a stand-by condition in the optical delay line memory. The optical wavelength gate 73 then functions to select a path through the optical signal paths 71a, 71b, 71c and 71d through which such optical signals is to be passed. The optical wavelength gate 73 is controlled by the controller 100.

In the lightwave system 70 according to the second embodiment, a required number of input/output interfaces (such as the optical circulators 42, 43, 66 and the electronic router 44) can be connected to the optical signal buses 71, so an arrangement of the lightwave system 70 becomes simple. By connecting the variable wavelength filters and the optical taps to the optical signal buses, the number of input/output interfaces which are connected to the optical signal buses can be augmented, thus affording an excellent expandability.

In other respects, the second embodiment is similar to the first embodiment previously mentioned.

Third Embodiment

Figure 7:
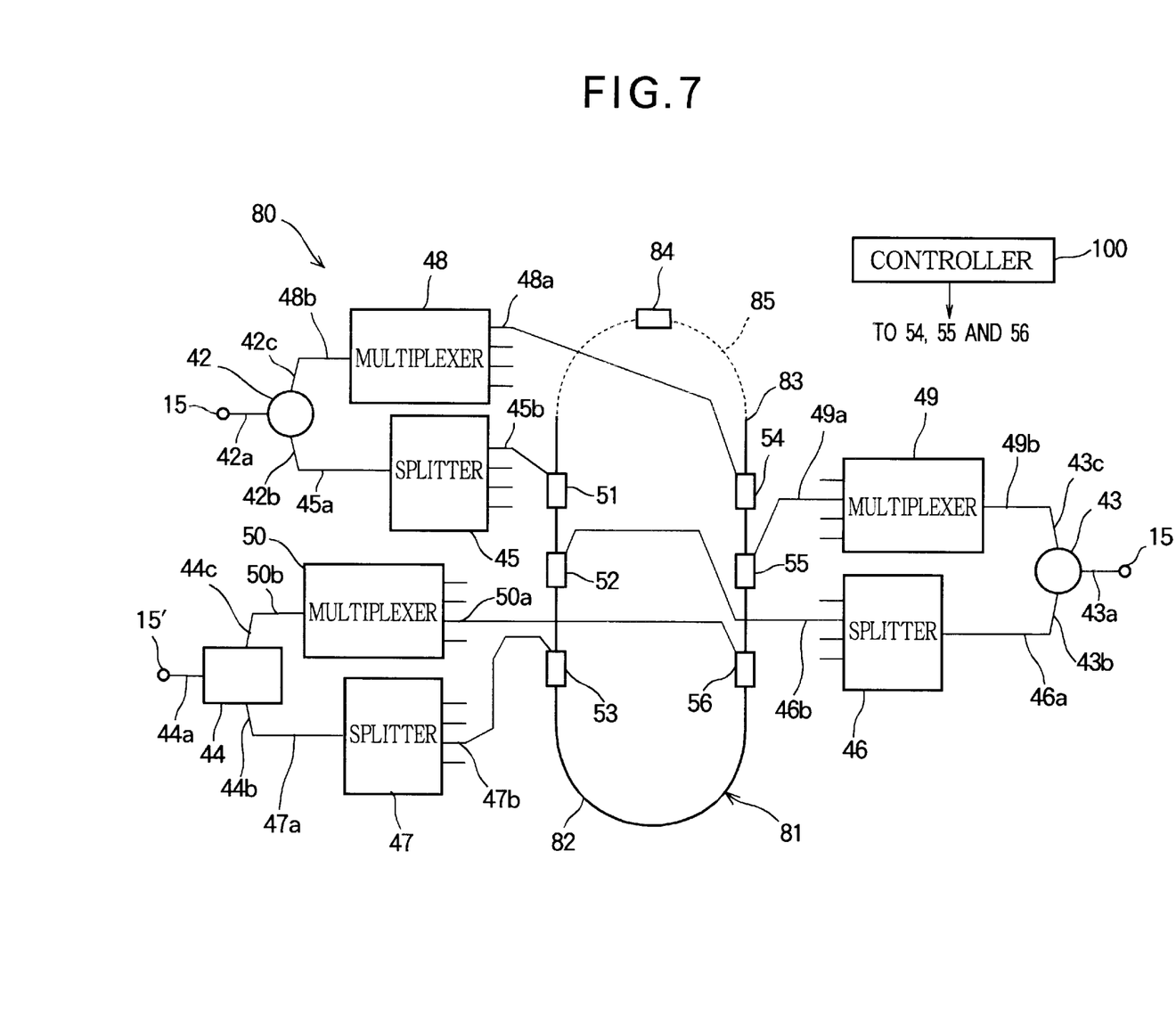
FIG. 7 is a schematic circuit diagram showing a lightwave system according to the third embodiment of the present invention.

FIG. 7 is a schematic circuit diagram showing a lightwave system 80 according to the third embodiment of the present invention. The lightwave system 80 has a multi-layer structure (which is not limited to four layers) of optical signal buses (optical linear buses) 81. However, to facilitate the understanding of the present invention, a single layer optical linear bus 81 is shown in FIG. 7.

The lightwave system 80 comprises three-port optical circulators 42 and 43, which are equivalent to those shown in FIG. 4. Further, the lightwave system 80 comprises an electronic router 44, which is equivalent to that shown in FIG. 4 and which is used to perform a wavelength channel switching or a packet switching.

Furthermore, the lightwave system 80 comprises wavelength splitters 45, 46 and 47 which divides the WDM optical signal into optical signals of different wavelengths, and optical multiplexers 48, 49 and 50 which multiplex a plurality of optical signals of different wavelengths. Moreover, the lightwave system 80 comprises optical taps 51, 52 and 53, through which the optical signals outputted from the wavelength splitter 45 are sent to the optical linear bus 81, and variable wavelength filters 54, 55 and 56 which derives optical signals of the selected wavelengths from among the optical signals on the optical linear bus 81.

The wavelength splitters 45, 46 and 47 have input ports 45a, 46a and 47a which are connected to the second port 42b of the optical circulator 42, to the second port 43b of the optical circulator 43, and to the second port 44b of the electronic router 44, respectively. The wavelength splitters 45, 46 and 47 have output ports 45b, 46b and 47b which are connected to the optical linear buses 81 of respective layers through the optical taps in a manner illustrated in FIG. 3.

The optical multiplexers 48, 49 and 50 have input ports 48a, 49a and 50a which are connected to the variable wavelength filters 54, 55 and 56, respectively, on the optical linear buses 81 in the respective layers. The optical multiplexers 48, 49 and 50 have output ports 48b, 49b and 50b, which are connected to the third port 42b of the optical circulator 42, to the third port 43b of the optical circulator 43, and to the third port 44b of the electronic router 44.

In addition, the lightwave system 80 comprises a controller 100 which designates the wavelengths of output signals which are to be transmitted from the variable wavelength filters 54, 55 and 56 to the optical linear buses 81. In the lightwave system 80, the optical taps 51, 55 and 53 which correspond to different input ports are disposed in series, and variable wavelength filters 54, 52 and 56 which correspond to different output ports are also disposed in series through a delay line 82. The operation remains the same as in the ring arrangement shown in FIG. 4. The delay line can be used as a buffer when switching a connection between input/output ports. In distinction to the arrangement of FIG. 4, the variable wavelength filters 54, 55 and 56 may be constructed to derive a reduced amount of optical signals from the optical linear buses 81 because a termination 83 of the optical linear bus 81 discards unnecessary signals to avoid an interference with one or more round delayed signals which occur in the arrangement of FIG. 4. Consequently, an optical signal which is inputted to an input port may be delivered to a plurality of output ports 15 or 15'. As indicated by broken lines in FIG. 7, an optical wavelength gate 84 which removes unnecessary signals may be used in combination with a delay line 85 to implement an optical delay line memory which is used for purpose of optical packet switching.

In the lightwave system constructed in the manner mentioned above, a multiplexed optical signal which is inputted through the first port 42a of the optical circulator 42 passes through the second port 42b to be inputted to the wavelength splitter 45 where the WDM optical signal is divided into several optical signals of different wavelengths to be inputted to the optical linear bus 81 in the respective layers through the optical tap 51, even though only one layer is shown in FIG. 7. Output ports of the wavelength splitter 45 are connected to the optical linear buses 81 in respective layers so that the optical signals having different wavelengths are inputted to the optical linear buses 81 in respective layers.

Optical signals are derived from among the optical signals on the optical linear bus 81 through the variable wavelength filters 54, 55 and 56. The optical signals which are derived through the variable wavelength filters 54, 55 and 56 are multiplexed with optical signals which are derived from the optical linear buses 81 of other layers in optical multiplexers 48, 49 and 50 to be delivered to the input/output ports 15 or 15' through the optical circulators 42 and 43 and the electronic router 44.

In the lightwave system 80 according to the third embodiment, the required number of input/output interfaces (such as the optical circulators 42 and 43 and the electronic router 44) can be connected to the optical linear bus 81, so an arrangement of the lightwave system 80 becomes simple. By connecting the variable wavelength filters and the optical taps to the optical signal bus, the number of input/output interfaces which are connected to the optical signal bus can be augmented, thus affording an excellent expandability.

In other respects, the third embodiment is similar to the first or second embodiment.

Figure 8:
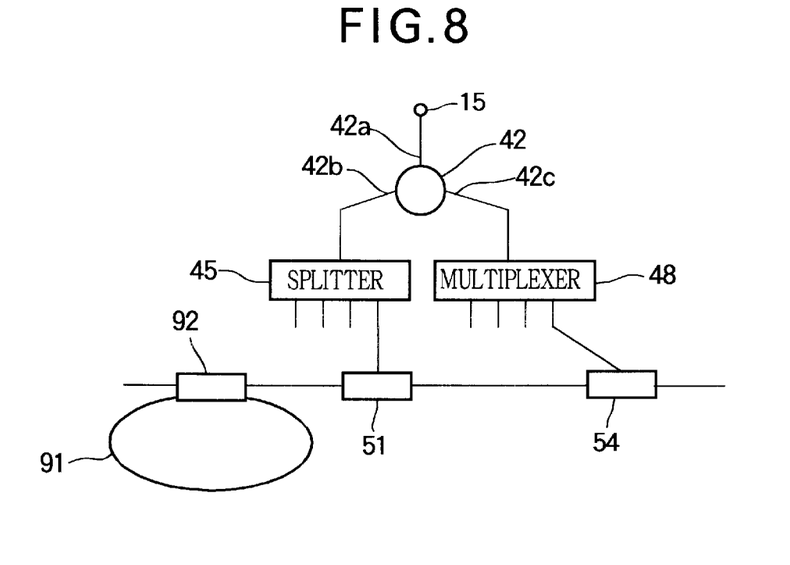
FIG. 8 is a schematic circuit diagram showing an optical delay line memory which can be applied to the lightwave system according to the first to third embodiments.

The lightwave system according to one of the first to third embodiments may be provided with an optical delay line memory as shown in FIG. 8, which corresponds to the optical delay line memory 13 shown in FIG. 1. The optical delay line memory comprises a delay line 91 and an optical switch 92 which feeds and receives signal to and from the delay line 91. The operation of the optical switch 92 is controlled by the controller 100.

Figure 9:
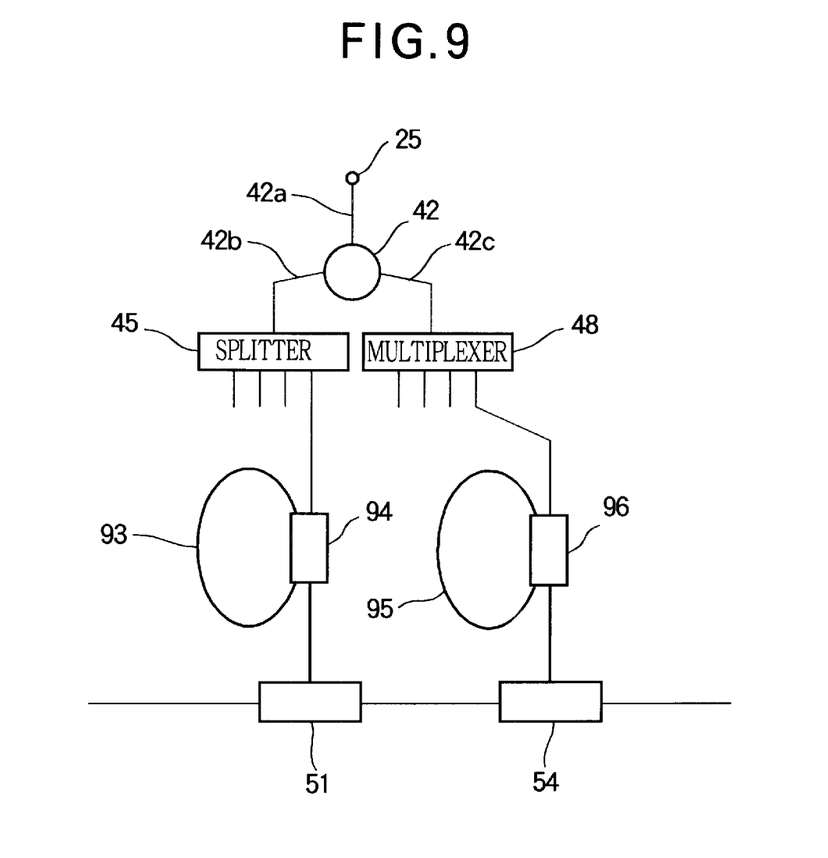
FIG. 9 is a schematic circuit diagram showing another optical delay line memory which can be applied to the lightwave system according to the first to third embodiments.

The lightwave system according to one of the first to third embodiments may be provided with an optical delay line memory as shown in FIG. 9, which corresponds to the optical delay line memory 23 shown in FIG. 2. The optical delay line memory comprises a delay line 93 and an optical switch 94 which feeds and receives signals to and from the delay line 93, or comprises a delay line 95 and an optical switch 96 which feeds and receives signals to and from the delay line 95. The operation of the optical switches 94 and 96 is controlled by the controller 100.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A lightwave system comprising:
    an optical signal-bus;
    an input/output interface including a first port, a second port and a third port, an optical signal inputted to said first port being outputted from said second port, an optical signal inputted to said third port being outputted from said first port;
    an optical tap, through which the optical signal which is outputted from said second port of said input/output interface is sent to said optical signal bus;
    a variable wavelength filter, through which an optical signal having a designated wavelength is outputted from said optical signal bus, thereby being sent to said third port of said input/output interface; and
    a controller which designates the wavelength of the optical signal which is to be sent from said optical signal bus through said variable wavelength filter.

2. The lightwave system according to claim 1, further comprising an optical delay line memory which temporarily stores the optical signal which is to be sent to said optical signal bus.

3. The lightwave system according to claim 1, further comprising an optical delay line memory which temporarily stores the optical signal which is sent from said second port of said input/output interface.

4. The lightwave system according to claim 1, further comprising an optical delay line memory which temporarily stores the optical signal which is sent from said optical signal bus through said variable wavelength filter.

5. The lightwave system according to claim 1, wherein said input/output interface is a three-port optical circulator.

6. The lightwave system according to claim 1, wherein said input/output interface is an electronic router.

7. The lightwave system according to claim 1, wherein said variable wavelength filter is an acoustic-optical wavelength filter element.

8. The lightwave system according to claim 1, wherein said optical signal bus is an optical ring bus.

9. The lightwave system according to claim 1, wherein said optical signal bus is an optical linear bus.

10. The lightwave system according to claim 1, further comprising a star coupler,
    wherein said optical signal bus includes a plurality of optical paths, opposite ends of which are connected to said star coupler.

11. A lightwave system comprising:
    a plurality of layers, each of which includes an optical signal bus, an optical tap, through which an optical signal is sent to said optical signal bus, and a variable wavelength filter, through which an optical signal having a designated wavelength is outputted from said optical signal bus;
    an input/output interface including a first port, a second port and a third port, an optical signal inputted to said first port being outputted from said second port, an optical signal inputted to said third port being outputted from said first port;
    a wavelength splitter which divides a wavelength division multiplexed optical signal into optical signals having different wavelengths, a wavelength division multiplexed optical signal inputted to said first port of said input/output interface being transmitted through said second port of said input/output interface to said wavelength splitter, the optical signals produced by said wavelength splitter being transmitted through said optical taps to said optical buses, respectively; and
    an optical multiplexer which multiplexes optical signals to produce a wavelength division multiplexed optical signal, optical signals being transmitted through said variable wavelength filters to said optical multiplexer, a wavelength division multiplexed optical signal produced by said optical multiplexer being sent to said third port of said input/output interface; and
    a controller which designates the wavelength of the optical signal which is to be sent from said optical signal bus through said variable wavelength filter.

12. The lightwave system according to claim 11, further comprising an optical delay line memory which temporarily stores the optical signal which is to be sent to said optical signal bus.

13. The lightwave system according to claim 11, further comprising an optical delay line memory which temporarily stores the optical signal which is sent from said second port of said input/output interface.

14. The lightwave system according to claim 11, further comprising an optical delay line memory which temporarily stores the optical signal which is sent from said optical signal bus through said variable wavelength filter.

15. The lightwave system according to claim 11, wherein said input/output interface is a three-port optical circulator.

16. The lightwave system according to claim 11, wherein said input/output interface is an electronic router.

17. The lightwave system according to claim 11, wherein said variable wavelength filter is an acoustic-optical wavelength filter element.

18. The lightwave system according to claim 11, wherein said optical signal bus is an optical ring bus.

19. The lightwave system according to claim 11, wherein said optical signal bus is an optical linear bus.

20. The lightwave system according to claim 11, further comprising a star coupler, wherein said optical signal bus includes a plurality of optical paths, opposite ends of which are connected to said star coupler.

* * * * *